United States Patent
Chase

(10) Patent No.: US 12,227,093 B2
(45) Date of Patent: Feb. 18, 2025

(54) CONFORMAL CHARGING SYSTEM

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 17/901,149

(22) Filed: Sep. 1, 2022

(65) Prior Publication Data

US 2024/0075823 A1 Mar. 7, 2024

(51) Int. Cl.
| | | |
|---|---|---|
| *H02J 50/12* | (2016.01) | |
| *B60L 53/12* | (2019.01) | |
| *H02J 7/00* | (2006.01) | |
| *H02J 50/00* | (2016.01) | |
| *H02J 50/10* | (2016.01) | |
| *H02J 50/90* | (2016.01) | |
| *B62D 25/20* | (2006.01) | |

(52) U.S. Cl.
CPC ............ *B60L 53/12* (2019.02); *H02J 7/0042* (2013.01); *H02J 50/005* (2020.01); *H02J 50/10* (2016.02); *H02J 50/90* (2016.02); *B62D 25/20* (2013.01)

(58) Field of Classification Search
CPC ...................................................... H02J 50/90
USPC ........................................................ 320/108
See application file for complete search history.

(56) References Cited

U.S. PATENT DOCUMENTS

| | | | |
|---|---|---|---|
| 10,988,042 B1 | 4/2021 | Chase | |
| 2012/0161696 A1* | 6/2012 | Cook | B60L 3/04 |
| | | | 320/108 |
| 2016/0114687 A1* | 4/2016 | Ichikawa | B60L 53/126 |
| | | | 307/104 |
| 2018/0158599 A1* | 6/2018 | Kamikihara | H02J 50/12 |
| 2019/0009680 A1* | 1/2019 | Kauffmann | B60L 53/126 |

FOREIGN PATENT DOCUMENTS

KR 20170099651 A * 9/2017 ............ H02J 7/0042

OTHER PUBLICATIONS

Internation Search Report and Written Opinion issued in PCT/US2023/031523; mailing date Sep. 28, 2023; 9 pages.

* cited by examiner

*Primary Examiner* — Edward Tso
*Assistant Examiner* — Ahmed H Omar
(74) *Attorney, Agent, or Firm* — CANTOR COLBURN LLP

(57) ABSTRACT

A wireless charging system for a vehicle and a method of operating is provided. The system includes a vehicle having a floor pan disposed opposite a ground surface. At least one battery is provided that is configured to provide energy to the vehicle. At least one power receiving coil is electrically coupled to the at least one battery and arranged within a housing adjacent the floor pan opposite the ground surface.

12 Claims, 9 Drawing Sheets

CONFORMAL CHARGING SYSTEM

BACKGROUND OF THE DISCLOSURE

The subject matter disclosed herein relates to a battery charging system, and in particular to a battery charging system associated with a vehicle Electric vehicles use electrical power stored in an energy storage device, such as a battery, to provide energy to motors that in turn move the vehicle. These batteries need to be periodically recharged to provide the desired energy to the vehicle. The recharging of the battery may be accomplished in several ways, such as by plugging the vehicle into an electrical outlet connected to a utility grid for example. Alternatively, the vehicle may be configured to wirelessly charge the batteries using induction. Induction chargers use a transmitting coil and a receiving coil that allow for wireless charging when the vehicle is parked over the inductive charger. The receiving coil, located on the vehicle, is usually mounted beneath the floor pan and extends into the space under the vehicle. It should be appreciated that this has the effect of reducing the ground clearance of the vehicle. Further, such decreased ground clearance becomes increasingly problematic because of a physical space conflict between accumulating snow, snow drifts, or substantial standing water and undercarriage equipment.

In the case of snow or other types of frozen precipitation, at minimum, such underhanging appendages may function as a "snow plow" blade which may then increasingly push and build up a mound of snow beneath a vehicle that can ultimately lift a vehicle's tires off of the ground surface with enough buildup thus hindering and/or preventing forward movement of a vehicle. In the case of contact with standing water, underhanging appendages or attachments can also hinder a vehicle's forward motion as plowing through liquids present considerably more drag than air. Finally, especially for vehicles that already have low inherent ground clearance, underhanging appendages effectively create an even lower and less desirable ground clearance by such underhanging equipment which puts such equipment in a position of increased physical contact vulnerability and degradation by roadway objects, etc.

While existing electric vehicles having inductive charging systems are suitable for their intended purposes the need for improvement remains, particularly in providing an electric vehicle having an inductive charging system with the features described herein.

BRIEF DESCRIPTION OF THE DISCLOSURE

According to one aspect of the disclosure, a wireless charging system is provided. The system includes a vehicle having a floor pan disposed opposite a ground surface. At least one battery is provided that is configured to provide energy to the vehicle. At least one power receiving coil is electrically coupled to the at least one battery and arranged within a housing adjacent the floor pan opposite the ground surface.

In addition to one or more of the features described herein, or as an alternative, further embodiments of the system may include a housing that further comprises an enclosure space that physically conforms to the power receiving coil(s).

In addition to one or more of the features described herein, or as an alternative, further embodiments of the system may include a housing that forms at least a portion of the floor pan, wherein the floor pan and housing form a substantially contiguous surface.

In addition to one or more of the features described herein, or as an alternative, further embodiments of the system may include a housing that is disposed a distance from the ground surface that is equal to or greater than an area of the floor pan adjacent the housing.

In addition to one or more of the features described herein, or as an alternative, further embodiments of the system may include a housing that includes a surface adjacent the floor pan, the surface being configured to allow magnetic and/or electro-magnetic radiation to pass through to inductively couple the receiving coil to a transmitting coil during operation.

In addition to one or more of the features described herein, or as an alternative, further embodiments of the system may include the at least one power receiving coil is movably disposed within the housing.

In addition to one or more of the features described herein, or as an alternative, further embodiments of the system may include a movement mechanism coupled to the at least one power receiving coil, the movement mechanism configured to move the at least one power receiving coil within the housing.

According to one aspect of the disclosure, a wireless charging system is provided. The system includes a vehicle having a floor pan disposed opposite a ground surface, the vehicle having a conformal space. At least one battery is provided that is configured to provide energy to the vehicle. A receiving coil is electrically coupled to the at least one battery and movably coupled to the conformal space, the receiving coil being disposed in a housing having a lower surface that is adjacent to and contiguous with the floor pan. A movement mechanism is operably coupled to the vehicle to move the housing from a first position at least partially within the conformal space and a second position, the second position being in a direction closer to the ground surface than the first position, wherein the movement mechanism moves the housing without reducing the floor pan to ground surface clearance.

In addition to one or more of the features described herein, or as an alternative, further embodiments of the system may include a movement mechanism that has at least one lifting cable, the housing being suspended from the vehicle by the at least one lifting cable when in the second position.

In addition to one or more of the features described herein, or as an alternative, further embodiments of the system may include a movement mechanism that has an electrical cable configured to maintain an electrical connection between the receiving coil and the battery when the housing is moved in the direction towards the ground surface.

In addition to one or more of the features described herein, or as an alternative, further embodiments of the system may include a movement mechanism further that has at least one motor operably coupled to the at least one lifting cable and configured to selectively move the housing between a lowered and a raised position.

In addition to one or more of the features described herein, or as an alternative, further embodiments of the system may include a seal member disposed between the housing the floor pan.

In addition to one or more of the features described herein, or as an alternative, further embodiments of the system may include at least the lower surface is made from a material configured to allow electromagnetic radiation to pass therethrough.

In addition to one or more of the features described herein, or as an alternative, further embodiments of the system may include a housing that further comprises an enclosure space that physically conforms to the power receiving coils.

According to another aspect of the disclosure, a method is provided. The method includes providing a housing having a conformal space in a vehicle adjacent a floor pan opposite a ground surface. A receiving coil is disposed in the conformal space. The receiving coil is electrically coupled to a battery in the vehicle. A inductive coupling is selectively generated between the receiving coil and a transmitting coil, the transmitting coil being operably disposed to the ground surface. The battery is charged when the inductive coupling is generated.

In addition to one or more of the features described herein, or as an alternative, further embodiments of the method may include forming a lower surface of the housing to provide a contiguous surface with the floor pan.

In addition to one or more of the features described herein, or as an alternative, further embodiments of the method may include moving the housing from a first position to a second position, the second position being closer to the ground surface than the first position.

In addition to one or more of the features described herein, or as an alternative, further embodiments of the method may include an inductive coupling that is generated when the housing is in the second position.

In addition to one or more of the features described herein, or as an alternative, further embodiments of the method may include moving the housing from the second position to the first position, the first position being within a conformal space of the vehicle.

In addition to one or more of the features described herein, or as an alternative, further embodiments of the method may include a movement of the housing being performed using a lifting cable.

In addition to one or more of the features described herein, or as an alternative, further embodiments of the method may include creating an environmental seal between the housing and the floor pan when the housing is in the first position.

In addition to one or more of the features described herein, or as an alternative, further embodiments of the method may include a conformal space of the housing that substantially conforms to the shape of the receiving coil.

In addition to one or more of the features described herein, or as an alternative, further embodiments of the method may include moving the receiving coil within the housing.

In addition to one or more of the features described herein, or as an alternative, further embodiments of the method may include the moving of the receiving coil being in response to an electrical characteristic of the inductive coupling.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
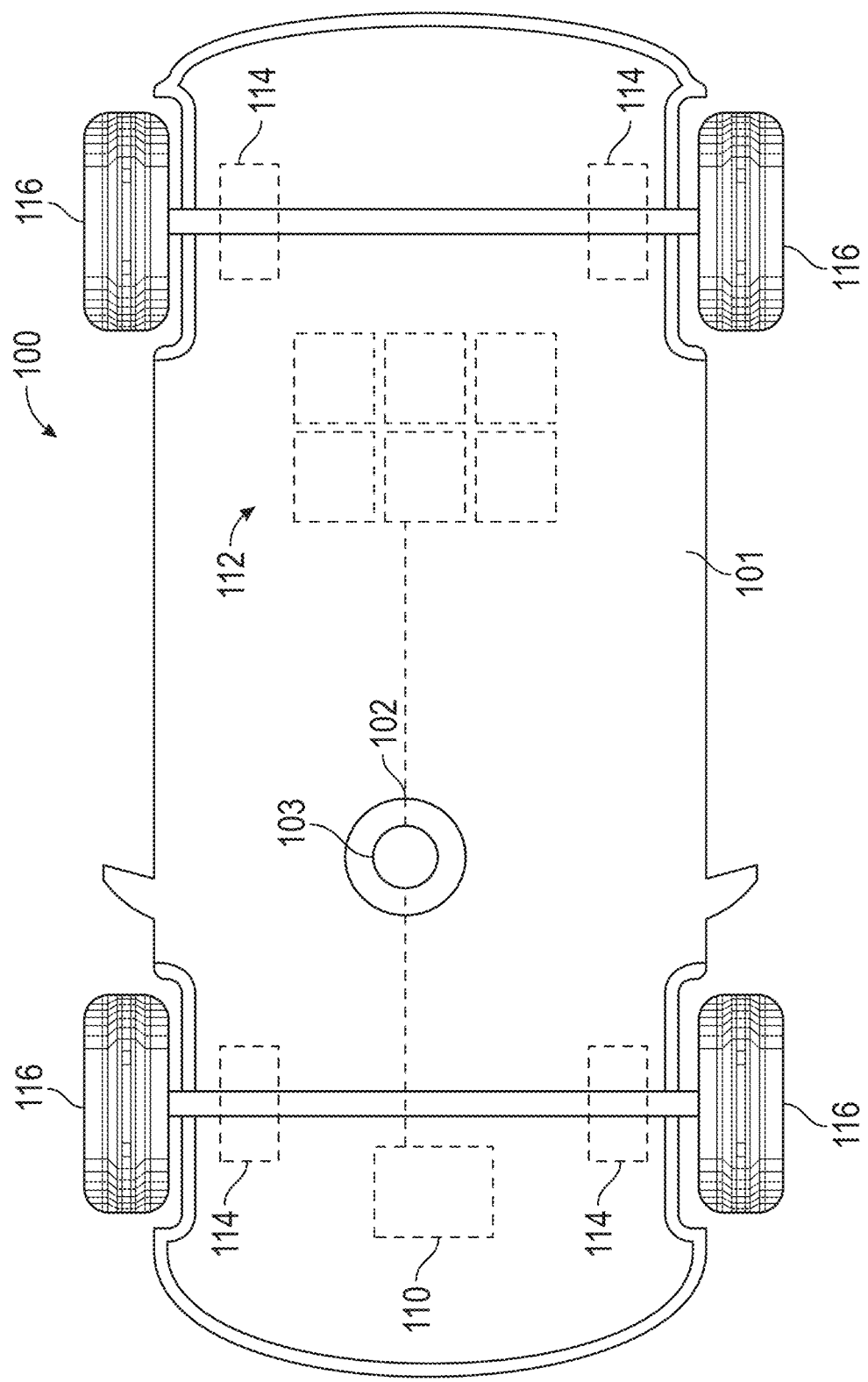
FIG. 1 shows an exemplary underside view of a vehicle floor pan equipped with a conformal CCS housing without a cover in place.

The detailed description explains embodiments of the disclosure, together with advantages and features, by way of example with reference to the drawings.

DETAILED DESCRIPTION OF THE INVENTION

Embodiments of the present disclosure provide for a Conformal Charging System (CCS) advantageously provides wireless charging capability to an Electric Vehicle (EV) without altering or compromising the exterior dimensions or aerodynamic characteristics of a vehicle. As such, the exterior ground clearance dimensions or excursions of a CCS-equipped vehicle are identical to the same model of a vehicle that is not equipped with CCS equipment. This holds true not only for passenger vehicles, but also for commercial, transport, industrial, or other types of vehicles and equipment such as construction equipment as well. CCS may be used in conjunction with virtually any type of wireless charging equipment or standard and is agnostic in that regard.

Currently proposed vehicular wireless charging standards include a "Z"-axis, or vertical transmission coil to receiving coil separation distance between the transmitting Ground Assembly (GA) 410 (FIG. 4A) transmission coils 412 and receiving Vehicle Assembly (VA) coils of typically 3.5-11.4 inches. The GA 410 may include a control system and a movement system such as that as is described in commonly owned U.S. Pat. No. 10,988,042, the contents of which is incorporated herein by reference. The transmission coils 412 may be positioned on the ground surface 400 as shown, or disposed flush to or below the ground surface.

The Conformal Charging System (CCS) provides for advantages in allowing for wireless electric vehicle charging capability and equipment to be used in a superior manner to those systems that are "attached" or appended to the underside embodiments of vehicle recharging equipment configurations thus avoiding the previously mentioned problems of traditional prior art vehicle charging arrangements.

Embodiments disclosed herein provide for a sealed VA equipment enclosure structure that effectively becomes an integral part of a vehicle's underside or floor pan rather than attaching recharging equipment such as charging coils on or beneath the undercarriage/floor pan of a vehicle as was done with prior art vehicles. It should be appreciated that the floor pan of most electric vehicles is configured to be aerodynamic, smooth, or in some instances flat, to avoid features that create drag and reduce the mileage efficiency of the vehicle since electric vehicles do not include a number of components that are found in internal combustion engines, such as but not limited to drivetrains (e.g. transmissions and drive shafts), exhaust systems and rear differentials for example.

In an embodiment, the CCVS accomplishes streamlining by utilizing in a conformal body manner an environmentally sealed internal enclosure housing that contains EV recharging equipment such as receiving coils, etc. without impinging upon any of the space below the general external floor pan or underside dimensions. In an embodiment, the lower surface of the CCVS defines a substantially contiguous surface of the floor pan. As a result, there is little or substantially no drag as a result of incorporating the CCVS into the vehicle.

In such embodiments the VA receiving coils would reside in an enclosure that physically conforms to the dimensions of the enclosed recharging receiving coil(s) in order to allow physical partitioning/separation of the typical high voltages handled by the receiving coils from other lower voltage vehicle components as well as the vehicle occupants, as well as reducing or minimizing the desired separation space for the VA within the vehicle body itself. Such equipment enclosures may be made of light gauge stamped or formed metal and depending on the embodiment would be either fitted to, or flush to the floor pan underside effectively placing the related recharging equipment above the vehicle's floor pan, or the conformal enclosure may be welded into the floor pan structure itself.

Since wireless charging systems typically utilize inductive charging technologies which inherently create magnetic fields, the shape, dimensions, and conformity of this metallic enclosure may also be configured to control spurious or undesired magnetic fields so as to optimize or improve the inductive field coupling, increase proximate "spillover" radiation safety factors, etc.

The underside cover of such enclosure would be configured to be transparent to typical charging magnetic fields, and would be made of non-metallic Radio Frequency (RF) or electromagnetic transparent materials. In other words, the cover or lower surface of the housing may be made from a material that allows electromagnetic radiation to pass through. In some embodiments, selected areas of a "charging field transparent" cover may also contain some areas made from materials such as mu-metal or other materials that inherently is able to control or limit RF or magnetic transmission, which may be used to further shape and/or define an overall area that would be transparent to electromagnetic or other such charging fields.

In other alternative embodiments the conformal enclosure and/or the cover/lower-surface may use materials such as resin compounds, etc. that have molded-in shielded sections. The dimensioning of such a conformal housing would be appropriate for, and vary according to the specific equipment (i.e. batteries or power packs) proximal to the conformal enclosure so as to minimize the space impingement to said equipment or space that surrounds the enclosure or is above it. In one embodiment, the conformal housing enclosure would be located within or be surrounded by a battery pack layout. Advantageously, such an embodiment would not only shield the electric cables that connect a VA receiving coil with the battery pack from physical damage and corrosion, but such an arrangement would also shorten the VA to battery pack interconnection distance thus lowering the cable(s) electrical resistance allowing for a superior interconnection.

In preferred embodiments, a typical CCS enclosure housing structure would have an "open" side or area that allows for external access for equipment installation, maintenance access, etc. Such "open" area would be fitted with a sealing element, such as a gasketed cover for example, to provide an environmental seal of the conformal structure interior in order to reduce or prevent any harmful moisture ingression. As was initially discussed herein, the dimensioning of the enclosure as well as the enclosure cover may be determined in large part by its context to the charging equipment that it houses. In one embodiment, the conformal housing would reside in a shallow recess (lip) of a vehicle's floor pan. Such recess would be dimensionally sized to allow a conformal housing and gasket to be flush with the floor pan exterior surface.

In another embodiment, the recharging coil itself, which normally remains in a fixed position relative to the enclosure cover within the conformal enclosure would optionally be equipped to be able to be positionally adjusted towards or away from the cover while still residing within the conformal enclosure to further adjust and optimize the gap between the GA, the CCS outer cover, or the lower surface of the receiving coil housing. Depending on the size, shape, and shielding elements of the CCS cover as well as the distance between the VA receiving coil and the CCS cover, this would also allow for the received electromagnetic field pattern to be dynamically shaped as well. Additionally, this embodiment when distancing the VA receiving coil from the cover "window" would also allow for received field strength attenuation allowing certain higher charging capacity or rate GA transmitting coils to be made compatible with a greater range of VA receiving coil voltages, charging current levels, etc.

The outside surface location(s) of the conformal enclosure cover within a vehicle's floor pan may be designed to allow the receiving coils or pads housed within to be adjustable and spaced away from the cover to further allow for variable spacing to improve or optimize the distance from a ground assembly (GA) transmitting coil. This allows a GA transmitting coil in some embodiments to be placed directly against the outside CCS cover surface while still allowing the VA receiving coil (internal to the conformal enclosure) adjustment flexibility in order to achieve in some circumstances a desired or optimized magnetic coupling dimension. Further to this, if "minor" or small "Z" axis (i.e. vertical relative to the ground plane) adjustments are desired, this embodiment would allow for a fixed GA mechanism to be used in some circumstances to achieve an improved or optimum "Z"-axis spacing between the transmitting and receiving power coils.

This would be advantageous, for instance, when a GA transmitting coil is pressing up against a conformal enclosure cover's underside, where in some instances it would not inherently be at an optimum or desired Z-axis spacing. The advantage of this is that in addition to its simplicity in construction and operation, this also provides an inherent ability to automatically compensate for any unexpected ground clearance variations, including those vehicles that are equipped with specialized heavy tread tires (e.g. winter and/or mud tires) as well as any snow and ice buildup on the tire tread, the use of tire chains, as well as the use of oversized tires which would effectively increase the tire diameter of a vehicle. This Z-axis compensation would ensure an optimum or improved current transfer with respect to the Z-axis. As used herein, the "Z-axis" is a direction substantially perpendicular to the ground surface or ground plane.

In other embodiments, such as where there is a desire to recharge a multitude of different types of vehicles (i.e. with greatly varying undercarriage heights) that may be fitted with a CCS, a further embodiment may allow some vehicles with the ability to lower an entire conformal enclosure from its normal "nested" position (typically by non-metallic cables) to allow for a wider range of GA to VA spacing to be accomplished. With this embodiment the entire conformal receiving coil assembly whose perimeter "lip" normally remains seated in a fixed position against the vehicle's floor pan would optionally be equipped with the ability to be moved (e.g. lowered and subsequently raised again) from against a vehicle's floor pan. The weight of the conformal enclosure and receiving coils would be sufficient to allow an unassisted lowering of the enclosure and coil. With this embodiment the VA receiving coil(s) (still within the conformal housing/enclosure) would be temporarily moved (e.g. lowered) below the floor pan ground clearance level and stay lowered only for the duration of the charging session. As discussed in more detail herein, at the conclusion of the charging session the conformal housing/enclosure would then be retracted back to an internal (to the vehicle) position within/above the floor pan wherein the well cover or lower-surface would fit back to the closed position either by mechanical means and/or tension on the lift/lowering cables. The upper outline of the conformal enclosure cover would normally rest against a complementary recessed lip of the floor pan which would be equipped with a flexible gasket to maintain an environmental seal of the conformal assembly to the floor pan.

In yet another embodiment, combined adjustment elements both internal to the CCS enclosure as well moving the entire conformal housing assembly itself from a vehicle may be combined to further extend the GA to VA adjustment range.

Referring to FIG. 1, an exemplary embodiment is shown of the underside of an electric vehicle (EV) 100. The vehicle 100 includes a control system 110 that is operably coupled to the VA receiving coil 103. The receiving coil 103 is arranged within a conformal housing 102 that is adjacent to or integrated with the floorpan 101. In the illustrated embodiment, the receiving coil 103 is mounted and completely enclosed within the housing 102. For clarity the housing cover 104 is not shown. The vehicle 100 further includes a battery 112 that may be comprised of one or more individual batteries or cells. The battery 112 is electrically coupled to receive electrical energy from the receiving coil 103. The battery 112 is further operably coupled to the control system 110 and a plurality of motors 114 for providing energy to rotate the tires 116 and move the vehicle 100. It should be appreciated that while the illustrated embodiment shows four motors 114, this is for illustrative purposes and the claims should not be so limited. The CCS described herein may be used with a vehicle having any number of motors.

Figure 2:
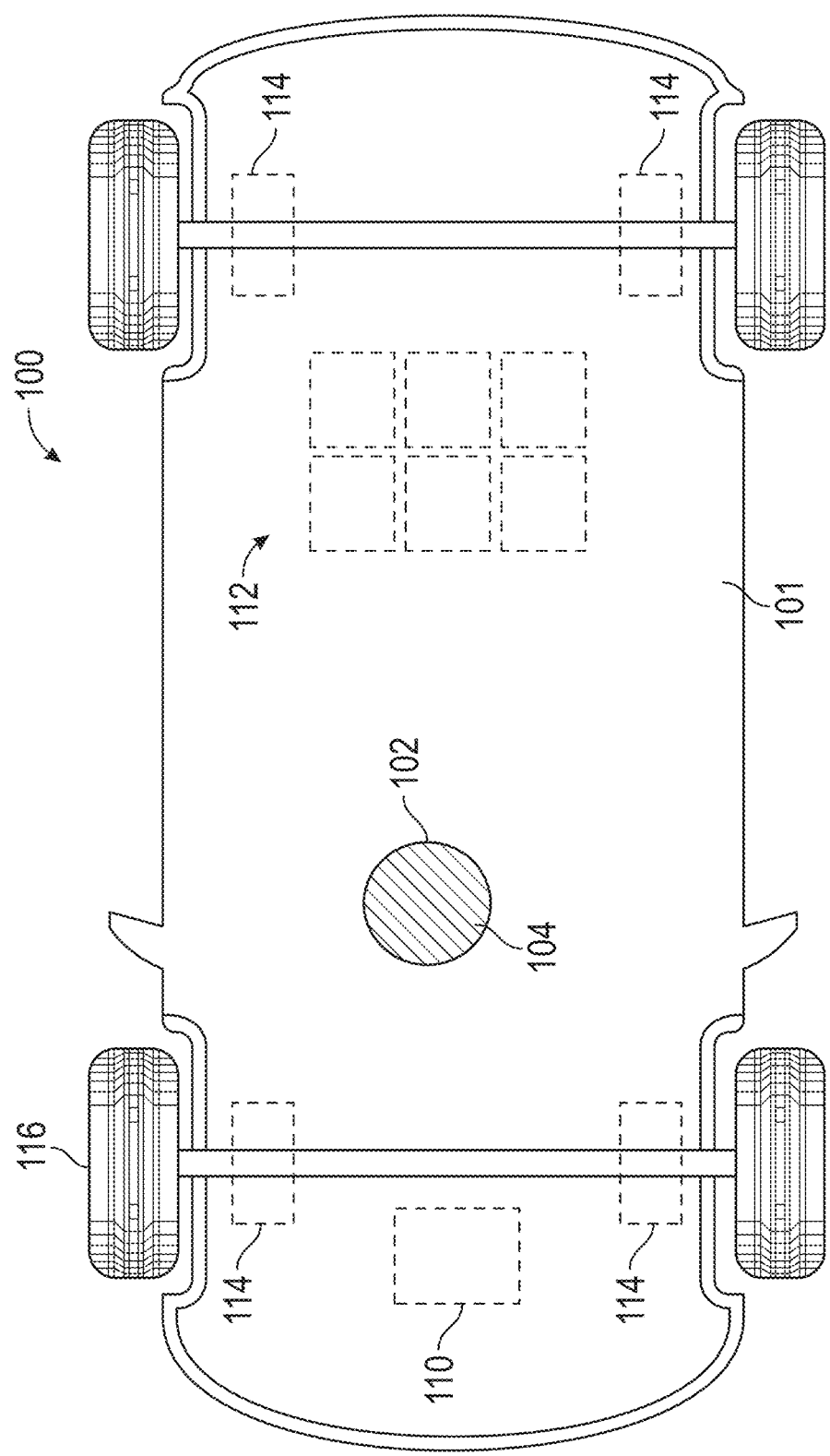
FIG. 2 shows an exemplary underside view of a vehicle floor pan equipped with a conformal CCS housing with a cover installed.

Referring to FIG. 2, an exemplary embodiment is shown of the underside of an electric vehicle (EV) 100, floorpan 101, and exemplary location of a conformal housing 102 and the housing cover 104.

Figure 3:
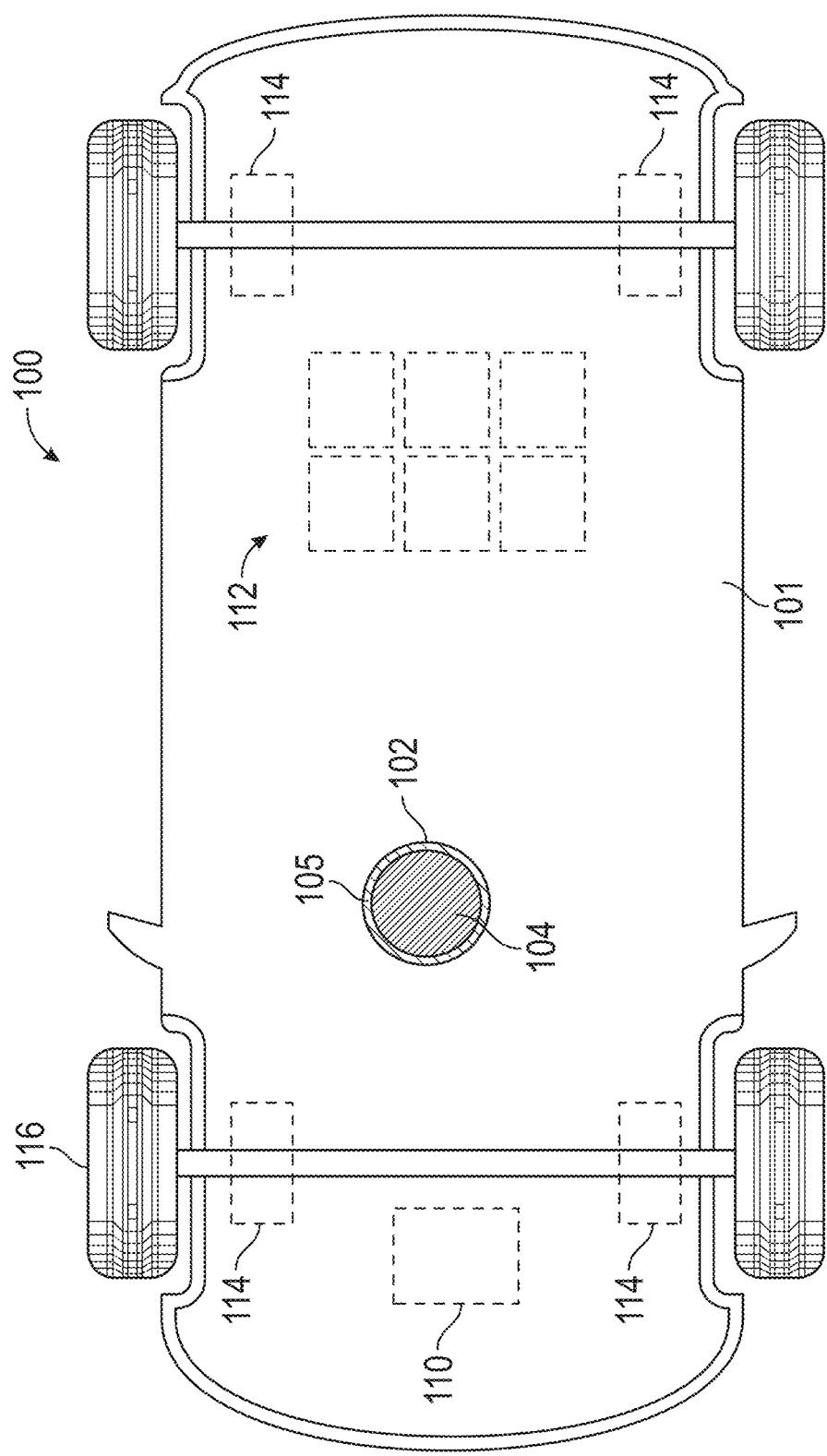
FIG. 3 shows an exemplary underside view of a vehicle floor pan equipped with a conformal CCS housing with a cover installed that is equipped with representative cover shielding elements in place.

Referring to FIG. 3, an exemplary embodiment is shown of the underside of an electric vehicle (EV) 100, floorpan 101, and exemplary location of a conformal housing 102 and the housing cover 104. In this embodiment cover 104 is equipped with selective electromagnetic shielding areas 105.

Figure 4A:
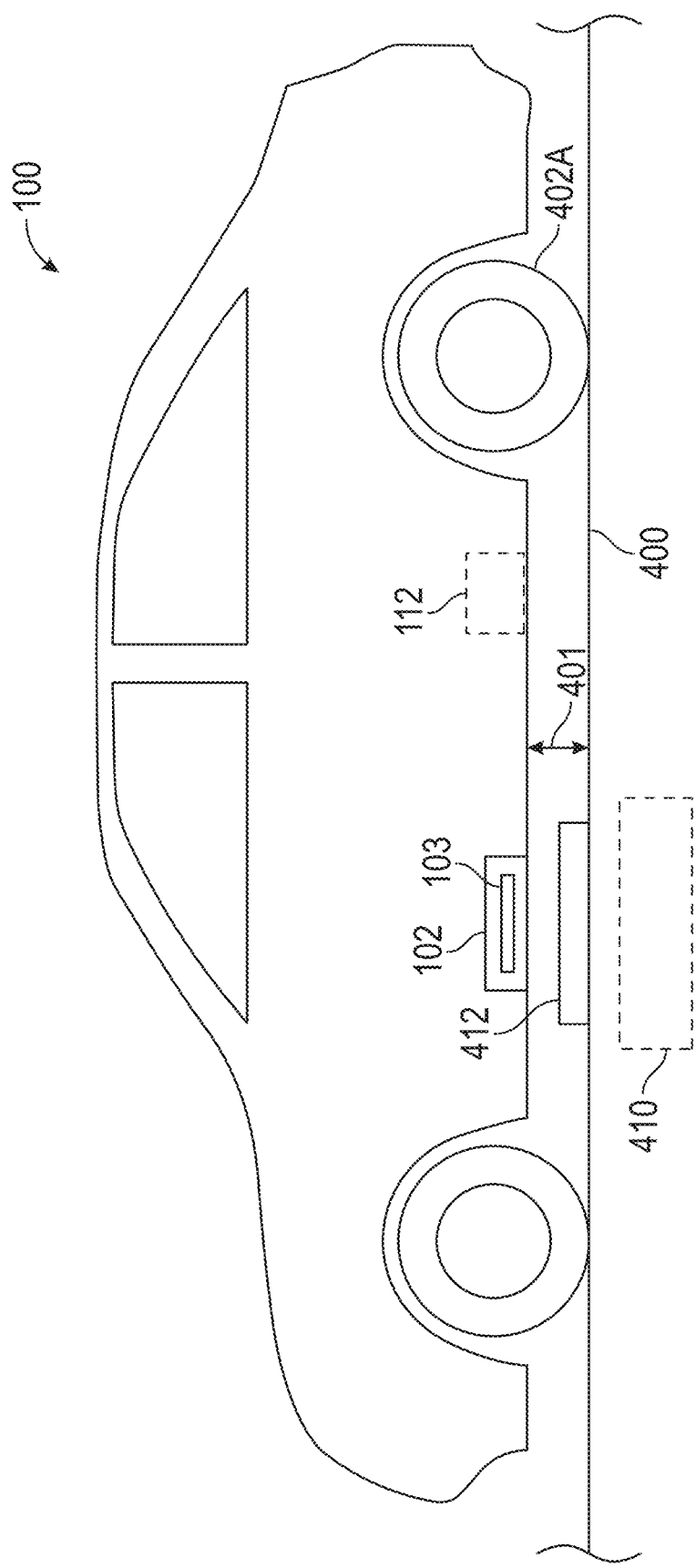
FIG. 4A shows a side view of a vehicle with an exemplary undercarriage to the ground measurement with clean tires.

Referring to FIG. 4A, an exemplary side view is shown of an electric vehicle (EV) 100 with standard/unmodified or "clean" tires 402A positioned on a ground surface 400. The standard tires 402A provide the vehicle 100 with a ground clearance as indicated by arrow 401. In the illustrated embodiment, when the vehicle 100 is positioned over the transmitting coil 412, the GA control system 410 provides electrical power to the transmitting coil to generate a magnetic field. The receiving coil 103 is positioned to inductively couple with the transmitting coil 412 and generate electrical power to charge the battery 112.

Figure 4B:
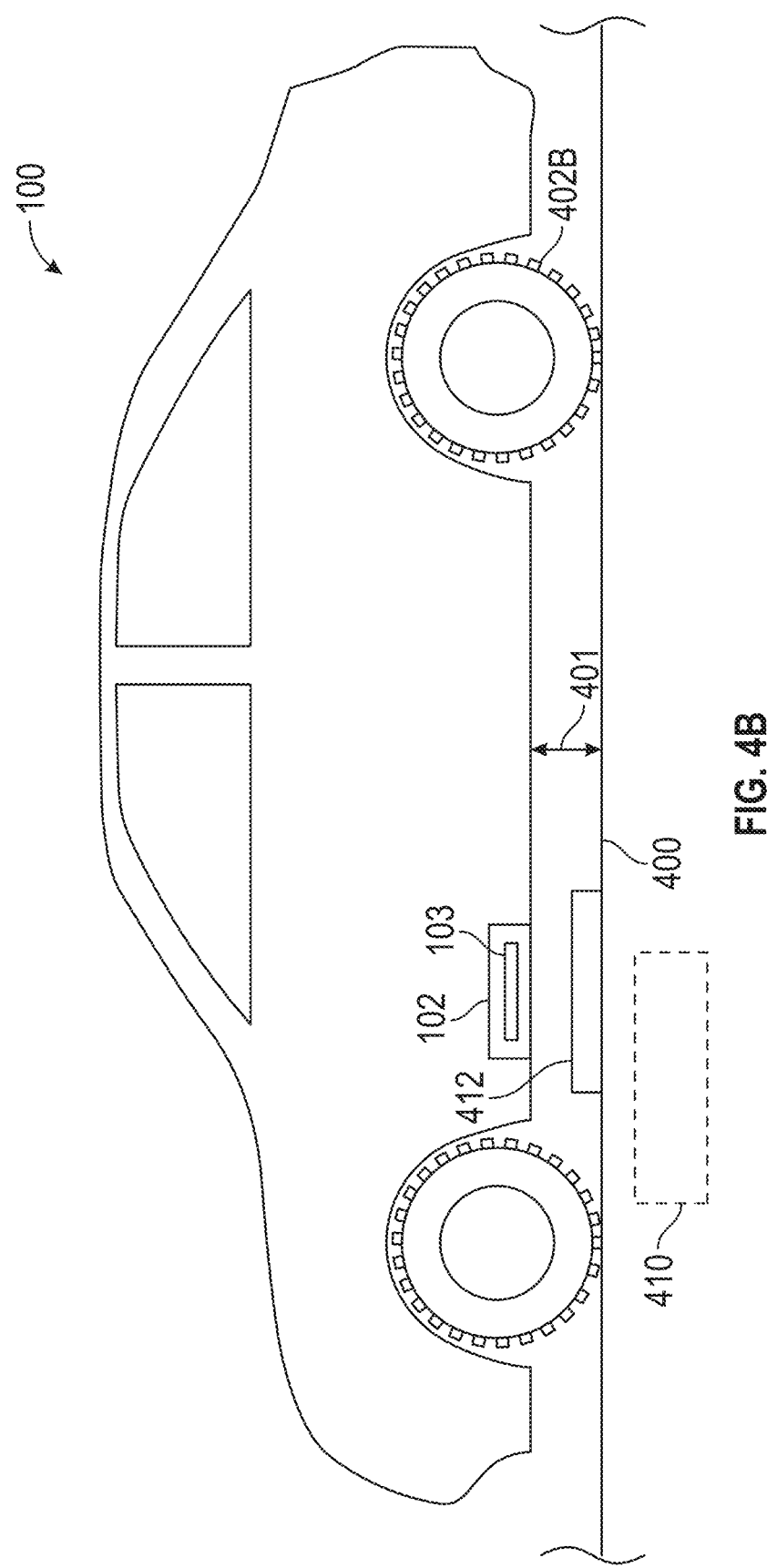
FIG. 4B shows a side view of a vehicle with of an exemplary undercarriage to the ground measurement with snow built up on the tire treads.

Referring to FIG. 4B, an exemplary side view is shown of an electric vehicle (EV) 100 with snow covered tires 402B positioned on a ground surface 400. The ground clearance is shown by the measurement 401. It should be appreciated that snow covered tires 402B increases the vehicle ground clearance which also increases the distances between the transmitting coil 412 and the receiving coil 103.

Figure 4C:
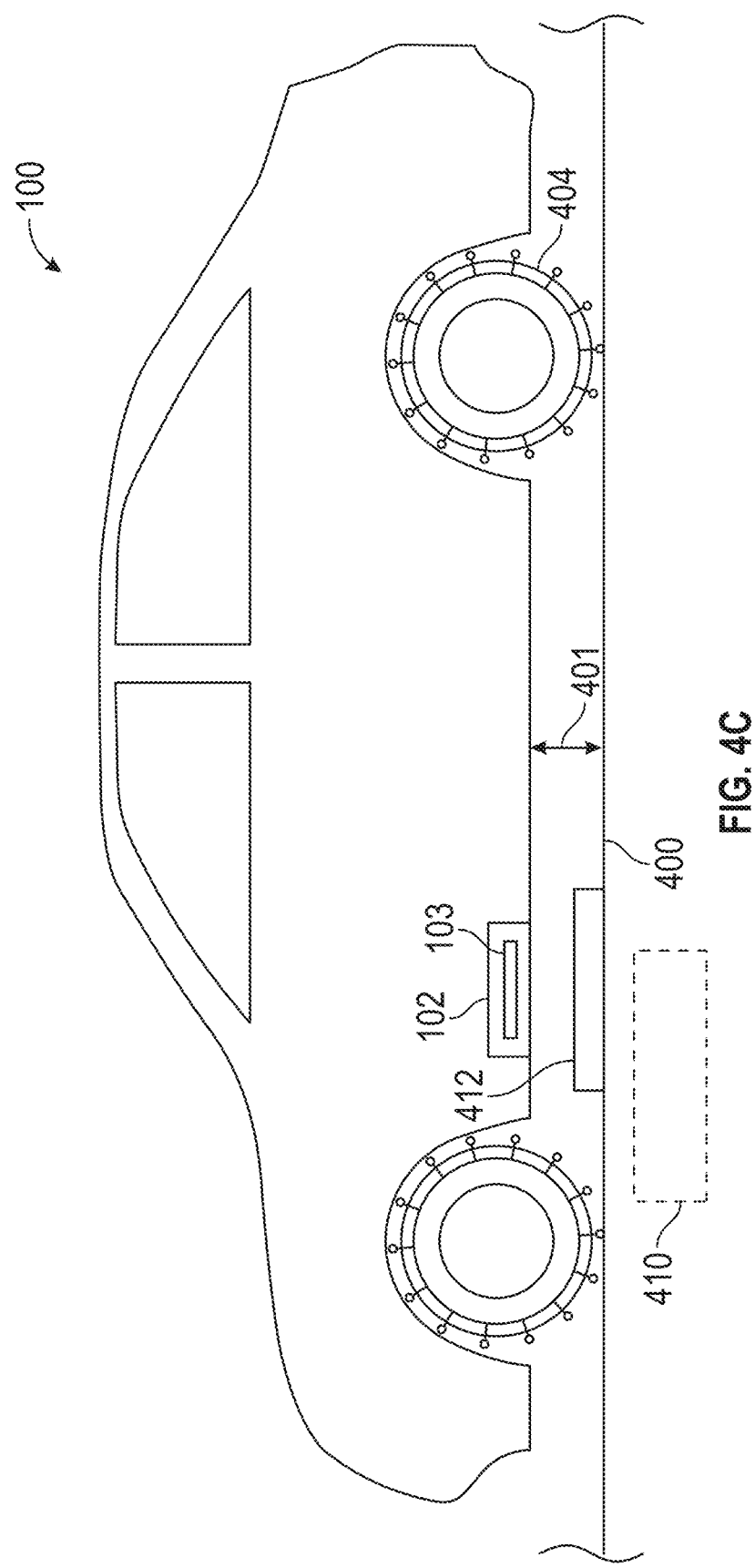
FIG. 4C shows a side view of a vehicle with an exemplary undercarriage to the ground measurement of tires fitted with chains.

Referring to FIG. 4C, an exemplary side view is shown of an electric vehicle (EV) 100 with tires 404 equipped with tire chains positioned on a ground surface 400. The tires 404 having tire chains has a ground clearance is shown by the arrow 401.

It should be appreciated that when the tire are changed (e.g. snow tires or chains are added), or the condition of the tires is changed (e.g. snow accumulation), the ground clearance 401 may also change. As such, the ground clearance 401 for the standard or clean tire 402A is less than that provided when snow accumulates on the tires 402B or when tire chains are added to tires 404. As a result in the increase in the ground clearance 401, the receiving coil may no longer be positioned at a desired height above the ground surface 400.

Figure 5A:
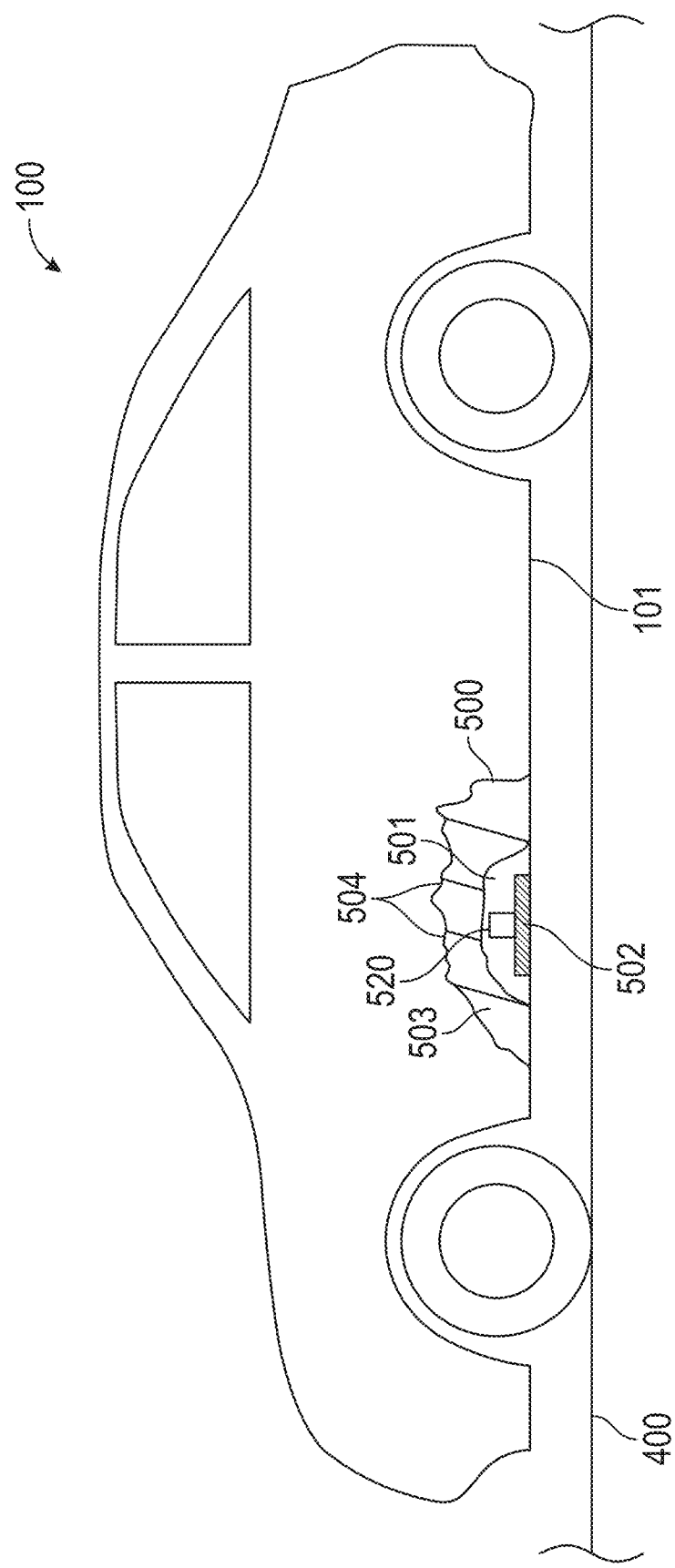
FIG. 5A shows a cutout side view of a vehicle fitted with an exemplary movable conformal enclosure in a "stowed" position.

Referring to FIG. 5A, an exemplary side view is shown of an electric vehicle (EV) 100 with a cutaway area 500 showing a conformal assembly housing 501 which contains a receiving recharging coil 502 disposed within the enclosure 501. In this embodiment the conformal enclosure 501 resides within an area above, a part of, or within the vehicle's floor pan area 101. In an embodiment, the recharging coil 502 is movable within the enclosure 501. This movement may be performed using a suitable mechanism 520, such as but not limited to slides or scissor mechanisms that are configured to move the recharging coil 502 in at least on of an x-direction, a y-direction, or a z-direction. It should be appreciated that by moving the recharging coil 502 within the enclosure, the performance or electrical transfer characteristics of the inductive coupling between the recharging coil 502 and the transmitting coil may be changed. In other words, the movement mechanism 520 may be used to correct for misalignments between the recharging coil and transmitting coil.

Figure 5B:
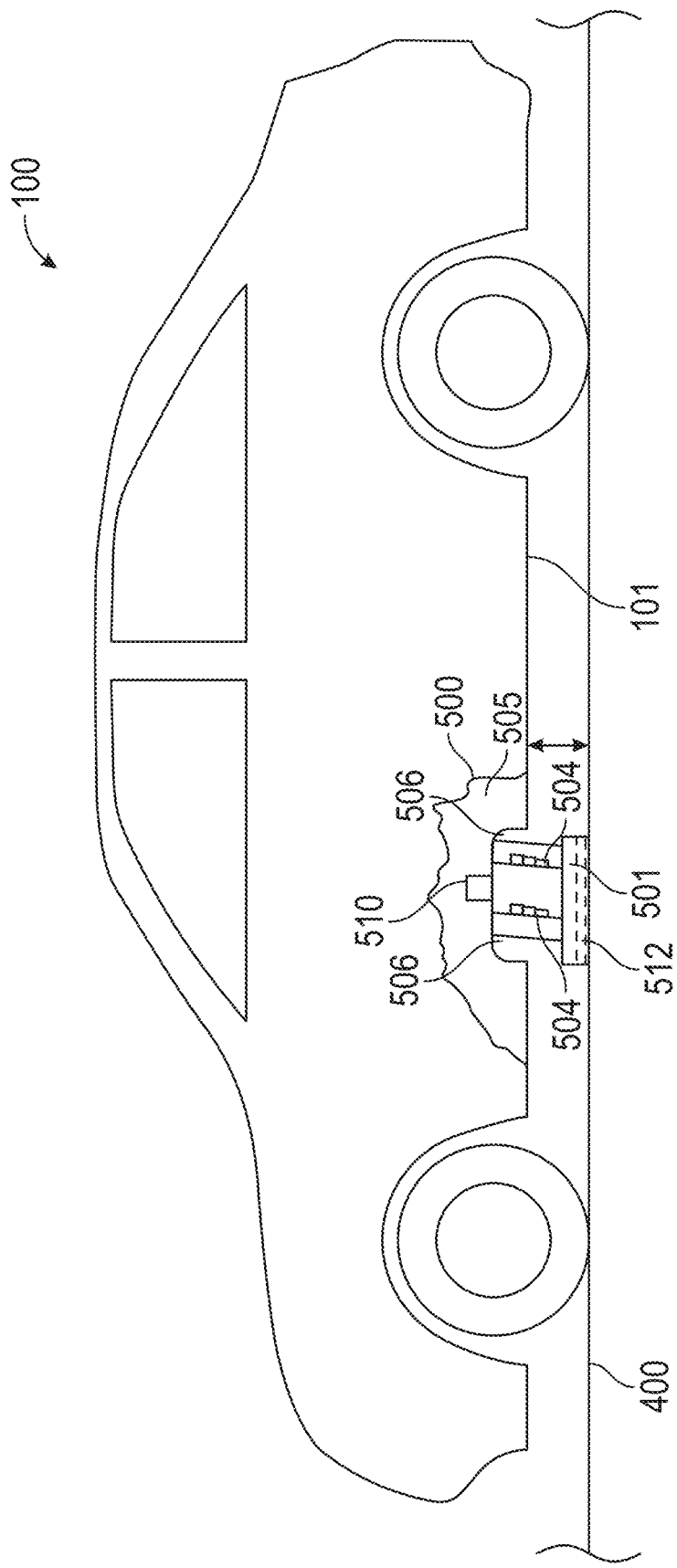
FIG. 5b shows a cutout side view of a vehicle fitted with an exemplary moveable conformal enclosure in a "lowered" position.

Turning to FIG. 5B, an exemplary side view figure of an electric vehicle (EV) 100 with a cutaway area 500 showing a conformal assembly housing 501 which contains a receiving recharging coil 512 contained within the enclosure 501. In this figure the conformal enclosure 501 has been temporarily lowered from its conformal "nesting" area 505 by a movement mechanism, such as lifting cables 506 for example, to a position below the floor pan 101 of a vehicle. In an embodiment, the housing 501 is suspended by the lifting cables 506 when in the illustrated position. In this embodiment, the charging coil within the conformal housing 501 is electrically coupled to the batteries via an electrical cable 504 that is configured to maintain the electrical connection when the housing 501 is moved between a first position in the conformal nesting area 505 to a second position where the housing is moved in the direction of the ground surface. In an embodiment, the electrical cable 504 is either coupled to a self-winding mechanism that retracts the electrical cable as the housing 501 is raised from a lowered position, or is inherently of the "curly-Q" or coiled type of self-retracting cable (e.g. a coiled shape that extends and retracts in a similar manner to an extension spring). It should be appreciated that while the illustration of FIG. 5B shows the housing 501 as being completely lowered to the ground surface, this is for exemplary purposes and the claims should not be so limited. In other embodiments, the housing 501 may be suspended a predetermined distance above the ground surface or the transmitting coil.

In an embodiment, the movement mechanism further includes at least one motor 510 that is coupled to the lifting cables to cause the movement of the housing 501 between a raised position and a lowered position (FIG. 5B). It should be appreciated that the movement mechanism may include other types of movement systems to cause movement of the housing 501, such as but not limited to pneumatic, hydraulic, scissor lift, or a rack and pinion arrangement for example. In an embodiment, the housing 501 includes a seal 512 disposed about a periphery of the housing 501 adjacent to the top and/or sides of the lower surface. The seal member 512 being configured to provide an environmental seal between the housing 501 and the floor pan 101 when the housing 501 is in the raised position (e.g. at least partially disposed within the conformal area 505).

Figure 5C:
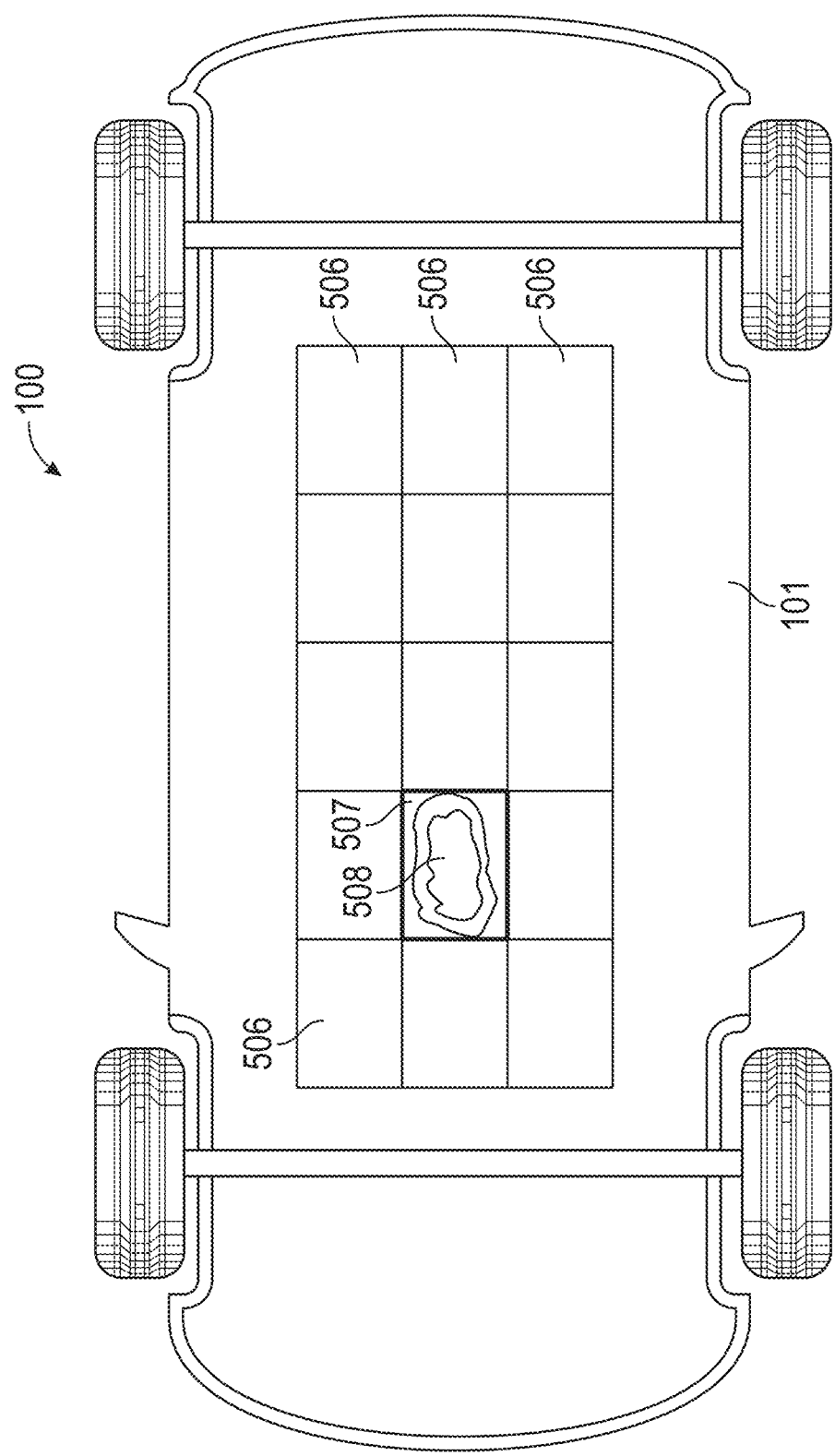
FIG. 5c shows an overhead cutout view of a battery layout as installed upon a floorpan that surrounds a conformal housing enclosure.

Turning to FIG. 5C, an exemplary overhead view of an electric vehicle (EV) 100 floor pan 101 that is configured with a plurality of batteries 506. In this embodiment, a conformal housing 508 is disposed in a conformal area 507. In FIG. 5C the batteries 506 surround the conformal charging enclosure space, but other embodiments may have batteries or battery packs located in areas other than immediately surrounding the conformal housing 508.

It should be appreciated that in one or more embodiments provided herein, including but not limited to the embodiment of FIG. 1, FIG. 2, FIG. 3, FIG. 5A, FIG. 5B and FIG. 5C, the floor pan 101 is a generally smooth surface and the conformal housing does not include features that substantially extend below the plane of the floor pan to hinder the operation of the vehicle.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A wireless charging system comprising:
  a vehicle having a floor pan disposed opposite a ground surface;
  at least one battery, configured to provide energy to the vehicle;
  a housing receivable within the vehicle adjacent to the floor pan, the housing including a body and a cover environmentally sealable to the body; and
  at least one power receiving coil electrically coupled to the at least one battery and arranged within the housing, wherein a configuration of the cover is selected to shape a flow of electromagnetic radiation provided to the at least one power receiving coil.

2. The system according to 1, wherein the housing further comprises an enclosure space that physically conforms to the power receiving coil(s).

3. The system according to 2, wherein the housing forms at least a portion of the floor pan, wherein the floor pan and housing form a substantially contiguous surface.

4. The system according to 2, wherein the housing is disposed a distance from the ground surface that is equal to or greater than an area of the floor pan adjacent the housing.

5. The system according to 2, wherein the housing includes a surface adjacent the floor pan, the surface being configured to allow magnetic and/or electro-magnetic radiation to pass through to inductively couple the receiving coil to a transmitting coil during operation.

6. The system according to claim 1, wherein the at least one power receiving coil is movably disposed within the housing.

7. The system according to claim 6, further comprising a movement mechanism coupled to the at least one power receiving coil, the movement mechanism configured to move the at least one power receiving coil within the housing.

8. A wireless charging system comprising:
a vehicle having a floor pan disposed opposite a ground surface;
at least one battery, configured to provide energy to the vehicle;
a receiving coil electrically coupled to the at least one battery;
a housing receivable within the vehicle and having a housing surface facing the ground surface, the receiving coil being arranged within the housing; and
a movement mechanism operably coupled to the receiving coil, the movement mechanism being operable to move the receiving coil within the housing away from the housing surface facing the ground surface to achieve a spacing associated with an optimal current transfer between the receiving coil and a transmitting coil located at the ground surface coil.

9. The system according to 8, wherein the housing further comprises an enclosure space that physically conforms to the receiving coil.

10. The system according to 8, wherein the housing further comprises a lower surface and the lower surface is aligned with the floor pan.

11. The system of claim 10, wherein the lower surface is made from a material configured to allow electromagnetic radiation to pass therethrough.

12. The system of claim 8, wherein the movement mechanism is operably coupled to the housing, the movement mechanism being operable to move the housing relative to the vehicle to adjust the floor pan to ground surface clearance.

* * * * *